United States Patent [19]

Schisselbauer et al.

[11] 4,187,980
[45] Feb. 12, 1980

[54] BADGE READER WITH RELIABLE DATA CLOCKING MEANS

[75] Inventors: John C. Schisselbauer, Southampton; John S. Garczynski; Richard J. Auchinleck, both of Norristown; Henry J. LoFurno, Philadelphia, all of Pa.

[73] Assignee: Peripheral Dynamics, Inc., Norristown, Pa.

[21] Appl. No.: 920,283

[22] Filed: Jun. 29, 1978

[51] Int. Cl.² ........................................... G06K 7/016
[52] U.S. Cl. ...................................... 235/474; 235/482
[58] Field of Search ............................... 235/474, 482

[56] References Cited

U.S. PATENT DOCUMENTS

| Re. 29,449 | 10/1977 | Gorgens | 235/474 |
|---|---|---|---|
| 3,496,342 | 2/1970 | Milford | 235/474 |
| 3,555,247 | 1/1971 | Gruczelak | 235/474 |
| 3,796,861 | 3/1974 | Hirata | 235/474 |
| 3,885,132 | 5/1975 | Luoma | 235/474 |
| 3,896,291 | 7/1975 | Wiedeman | 235/474 |

*Primary Examiner*—Daryl W. Cook
*Attorney, Agent, or Firm*—Woodcock, Washburn, Kurtz, Mackiewicz & Norris

[57] ABSTRACT

Apparatus is disclosed for reading a data encoded badge or document, wherein the operator manually inserts the badge into the reader. In the preferred embodiment, there is provided a movable slide element having clock holes thereon and means for ensuring that such slide moves in synchronism with the badge as it is inserted into and withdrawn from the reader by the operator. Suitable sensors and accompanying electronics are provided to synchronize the reading of data from the card with the detection of the passage of slide clock holes past a predetermined point in the reader. Special reader electronics is provided to ensure reliable clock detection, and to inhibit false generation of clock signals which could result from sensor ringing.

11 Claims, 11 Drawing Figures

BADGE READER WITH RELIABLE DATA CLOCKING MEANS

BACKGROUND OF THE INVENTION

1. Field of the Invention

This invention lies in the field of badge and document reading devices and, more particularly, manually operable badge readers.

2. Description of the Prior Art

The rapidly expanding data processing technology has forced development of many new modes of data collection. One such mode that is currently increasing and has a large potential for industrial application is that of collecting data from badges or the like which are carried by individuals. In many industrial systems, activity records and other events are monitored by having individuals at predetermined locations insert badges into readers, which badges are designed to be encoded so as to permit reliable data recognition. The types of such badges are standardized, and for many of the badges in use it is either impractical or undesirable to have a motorized transport system within the reader. For this reason, the prevalent arrangement is to have the person who carries the badge insert it manually and withdraw it manually from the reader, during which time the reader must perform the reading operation.

One possible method of triggering the reader to read the encoded data as the badge is entered or withdrawn, is to place synchronizing or clock marks on the badge or document itself. Thus, it is a standard practice in the art of document reading generally to have clock signals printed along a side or a particular column of a document, which signals are detected as they pass by a sensor, thereby giving rise to clock signals which in turn are used to control reading of encoded data. One problem with this arrangement is that it substantially increases the cost of the badges. Another problem with this form of prior art arrangement is that it has been very difficult to encode such clock holes, or marks in such a way that they can be accurately sensed so as to produce only one clock signal corresponding to a given clock hole. The response of most sensors such as are conventionally used for generating such clock signals is such that ringing occurs at both the beginning and the end of the detected clock hole, which ringing may give rise to falsely generated clock signals. Also, the use of clock or reference indicia on the badge itself, while useful in many applications, imposes a requirement that the clock information be very accurately aligned with the encoded data, which is not always the case in practice.

SUMMARY OF THE INVENTION

It is an object of this invention to provide a badge reader of flexible design, permitting badges of different types to be inserted from different angles, e.g., from above, from below, from the side.

It is another object of this invention to provide a badge reader having improved sensing and clocking circuitry for providing reliable clocking out of data encoded on the badge.

It is another object of this invention to provide a manually operated card reader incorporating a slide which contains clock holes, and which is moved in synchronism with the badge being read.

In accordance with the above objects, there is provided badge reading apparatus for reading a data encoded badge, having a mechanical structure with a channel for receiving the badge within the apparatus, the channel having a slide positioned therein having clock holes or marks and adapted to move within said channel in abutting relation to the badge, means being provided for maintaining the badge and slide in such fixed abutting relation while the badge is moved in a given direction, and improved means for reading the encoded data from the badge while the badge is moved in a given direction. The reading means incorporates circuitry for synchronizing the data reading with the detected movement of the slide, and specific electronic circuitry for ensuring reliable clock signal generation corresponding to each passage of a slide clock hole past a predetermined location within the reader, such circuitry being designed to suppress generation of false clock signals in response to sensor ringing.

DESCRIPTION OF THE PREFERRED EMBODIMENTS

Figure 1:
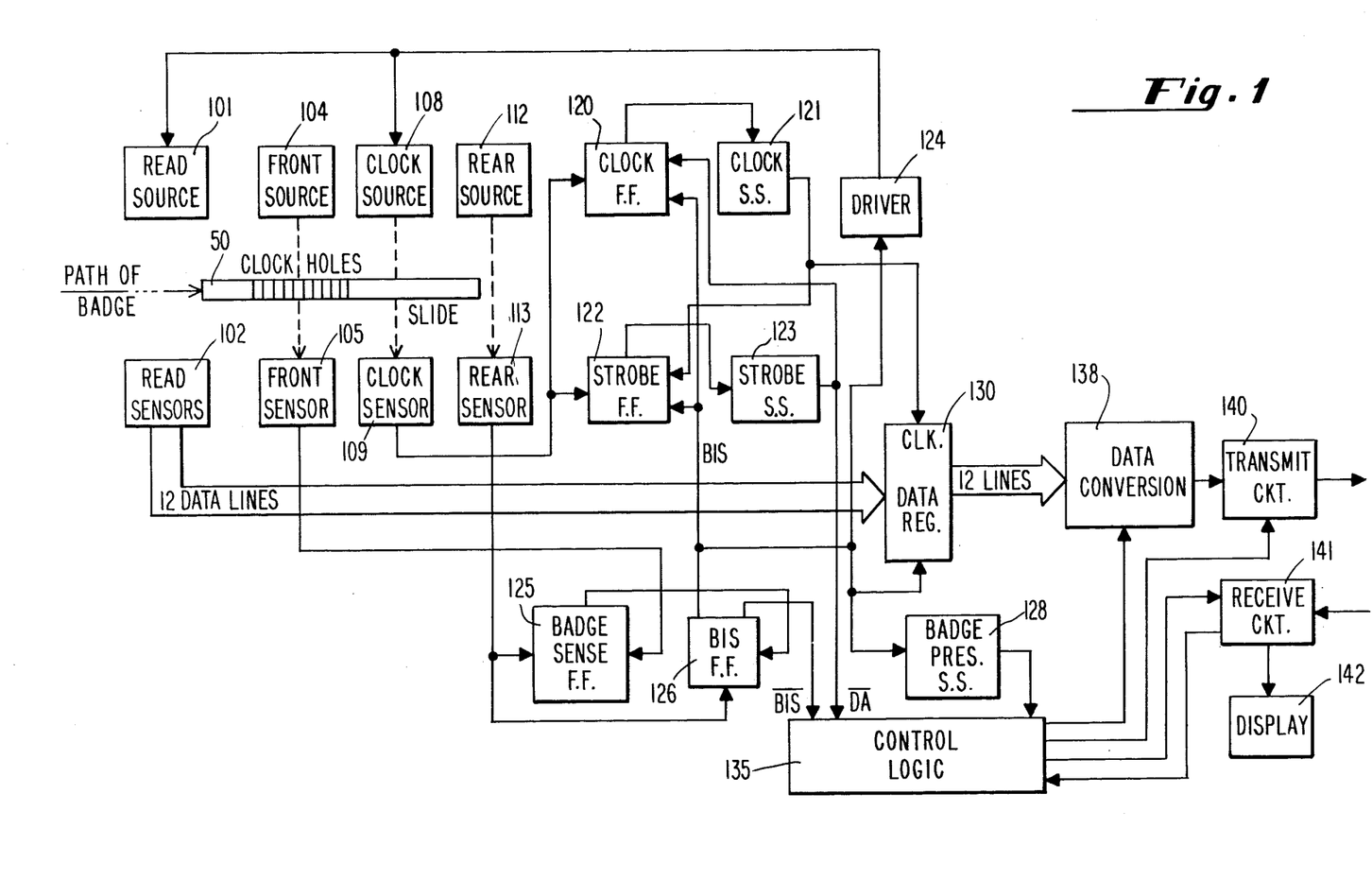
FIG. 1 is a block diagram of the reader circuitry utilized in the badge reader of this invention.

Referring now to FIG. 1, there is shown a block diagram of reader circuitry adapted for use with the card reader of this invention. The reader circuitry as illustrated may be utilized with any one of the mechanical arrangements disclosed, and may be adapted as a matter of design to accommodate slightly differing mechanical arrangements within the spirit of the invention. As illustrated, the reader circuitry is adapted particularly to provide for the detection of information from a badge reader utilizing a slide element for generating synchronizing clock signals for use in reading data from the badge. While the badge reader of this invention is illustrated solely in terms of a punched hole type reader, utilizing a slide element having clock holes, it is understood by those of skill in this art that mark sense equipment may be used in an entirely equivalent manner. Indeed, the slide may be made adaptable for use with different types of badges by placing on it a removable strip of tape, the tape carrying clock marks of a desired number and spacing to accommodate the particular badge to be read. Thus, the badge to be read may have marks instead of holes to indicate data, and likewise the slide may have marks instead of holes. In this alternate embodiment, a light source and light sensor arrangement, such as illustrated in U.S. Pat. No. 4,088,265, assigned to the same assignee, may be utilized.

In the description of the electronic reader circuitry which follows, it is assumed that the badge being utilized is a typical type 3 plastic badge, suitably having 12 rows of Holerith data and 15 columns. It is to be understood that other types of badges may be employed, with varying data fields. The type 3 badge utilizes a cut corner for orientation purposes, as is conventional. The cut corner enables determining when the badge has reached a "bottomed" position, denoting that the badge has been read. By this technique, if the badge is inadvertently put into the reader in an incorrect orientation, no data is transmitted from the reader, and it is necessary for the user to remove the badge and reinsert it in the correct orientation. Other types of badges may, or course, also be used. However, it is necessary to have clock holes (or marks) in the slide element corresponding to each column of data encoded on the badge.

Figure 2A:
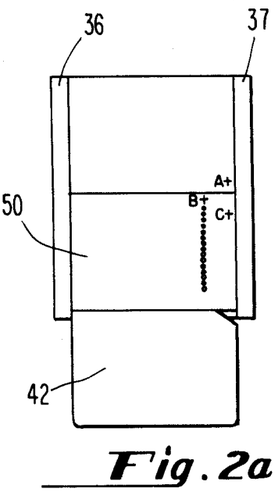
FIGS. 2a, 2b and 2c are schematic representations showing the operative relation of the badge and the slide as employed in a first embodiment of this invention.
Figure 2B:
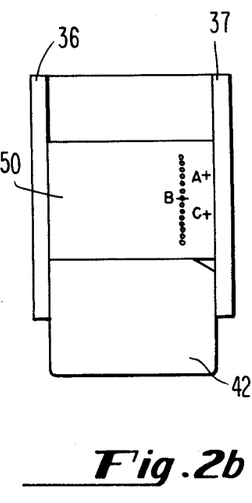
Figure 2C:
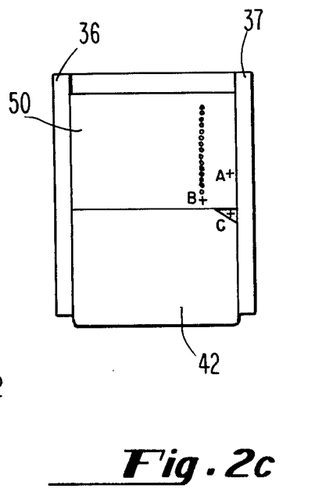
Figure 3:
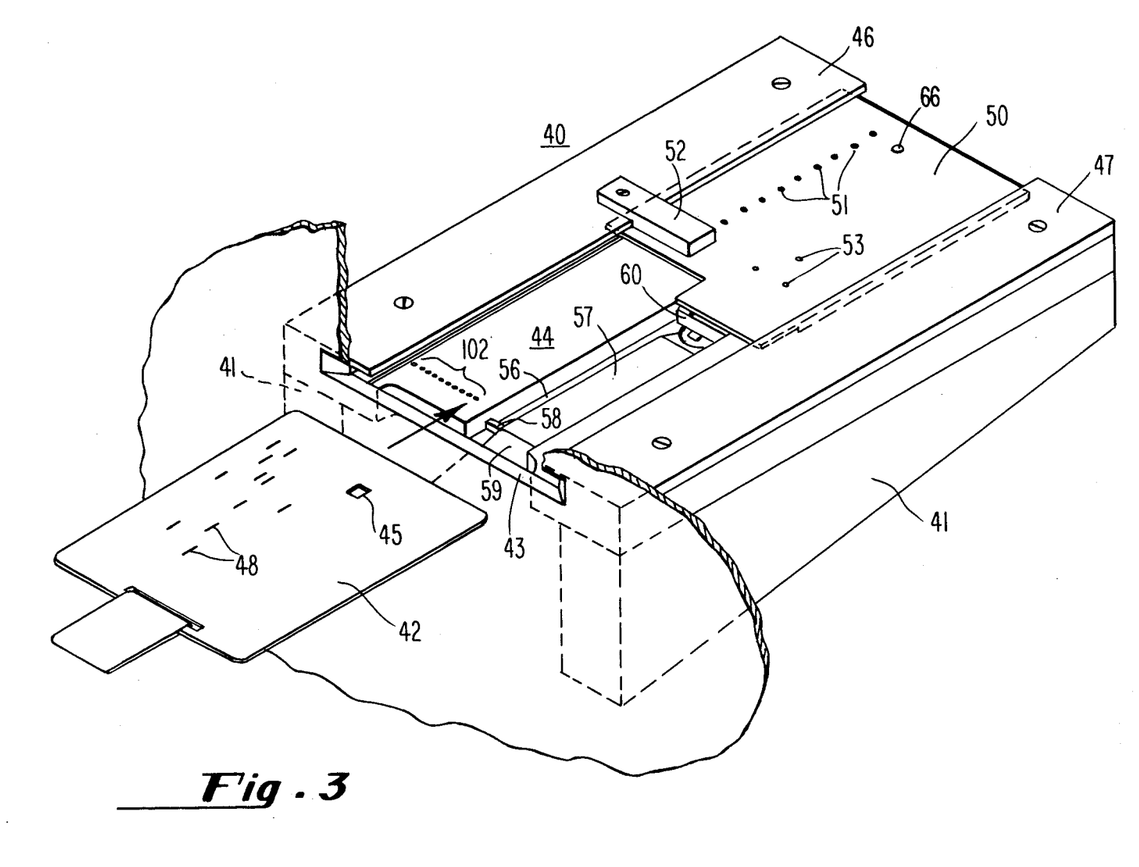
FIG. 3 is a perspective view of the mechanical assembly of another embodiment of the invention.

Referring to FIG. 1, the path of the badge carries it between four opposed source-sensor pairs, namely the read source 101 and read sensors 102; front source 104 and front sensor 105; clock source 108 and clock sensor 109; and rear source 112 and rear sensor 113. The badge is caused to contact a slide 50 in a manner as seen in FIGS. 2 and 3, the slide providing an opposing force such that the badge and the slide are maintained in a close abutting relationship. As the badge is pushed into the reader against the slide, the back or distal end of the slide first cuts the beam of light from the rear source 112, suitably an infra-red LED, to the rear sensor 113. As the badge progresses further into the reader, the first column of data comes into alignment with read source 101 and read sensors 102 at the same time that the distal most clock hole comes into alignment with clock source 108 and clock sensor 109. Read source 101 is suitably an array of 12 infra-red emitting LEDs in opposing registration with the read sensors which comprise an array of 12 phototransistors. The columns of data are read one at a time, corresponding to the coincidence of each column with a corresponding clock hole in the slide. When the light from one of the read source LEDs is interrupted by unpunched badge material, the corresponding row is interpreted as containing a zero, and when the light is passed through a hole or holes, such row or rows are interpreted as containing ones. The output of the phototransistors is suitably a high impedance when reading a zero and pulls toward ground or low impedance when reading a one.

In operation, when the hole pattern for a given column is centered over the read head, the clock hole in the slide for the corresponding column just uncovers, and light from the clock source, also suitably an infrared LED, strikes the clock sensor, providing an output which is used to gate the data from the read sensors, as described below. As the badge is pushed further into the reader, the read process is repeated for each of the columns of data, each of the successive clock holes in the slide causing the entry of data sensed by the read head for each successive badge column. After all of the columns of the data on the badge have passed the read head, light from the front source 104, suitably an infrared emitting LED, strikes front sensor 105, if but only if the badge has been oriented properly such that the cut corner is properly positioned. If the badge has been inserted properly, then the front sensor 105 output goes to ground or near ground, extinguishing a ready light (not shown) on the front of the reader and causing initiation of transmission of the data which has been read.

Still referring to FIG. 1, blocks 120-126, 128 and 130 represent what is referred to as the reader logic portion of the circuitry. The reader logic circuitry interfaces the read head and the other sensors to the rest of the electronics. The clocking circuit consists of clock flip-flop 120 and clock single shot 121 in a cross-coupled arrangement with stroke flip-flop 122 and strobe single shot 123. The purpose of the arrangement is to allow only one clock pulse to be generated for each dark to light transition of the clock sensor, i.e., corresponding to each clock hole which is sensed as the slide is moved past the clock source. It is to be remembered that, due to the fact that the reader will be manually operated, there will be a relatively large range of badge movement velocity, giving rise to the possibility of false ringing signals from the clock sensor. The clocking circuit utilized in the reader of this invention is designed to permit reliable clocking of data over such anticipated large range of badge movement velocity.

The output of the clock sensor 109 is inputted to both clock flip-flop 120 and strobe flip-flop 122. The output of rear sensor 113 is inputted to the set terminal of badge sense flip-flop 125, as well as to the set terminal of BIS (badge in station) flip-flop 126. The BIS output from flip-flop 126 is connected to strobe flip-flop 122, clock flip-flop 120, driver 124, badge present single shot 128 and data register 130. The relationship of these blocks is seen from the discussion of the circuit operation immediately following. It is to be understood that the various circuits represented by these blocks can be made to be set (or reset) with high or low signals, by incorporating an inverter circuit before the set (or reset) terminal.

Initially, with no badge in the reader, front sensor 105 is dark and rear sensor 113 is light. The rear sensor output keeps badge sense flip-flop 125 in the set condition. When the badge is inserted and the slide interrupts the light from rear source 112, rear sensor 113 goes dark and set BIS flip-flop 126. BIS flip-flop 126 remains in the set condition until the badge bottoms in the reader, at which time the front sensor output resets badge sensor flip-flop 125, the output of which in turn resets the BIS flip-flop 126. Thus, flip-flop 126 generates an enable signal (BIS) from the time the slide first starts to move backward until the slide bottoms, which enables clock flip-flop 120 and strobe flip-flop 122 as long as the badge is in the station being read. The BIS signal is also connected to driver 124, which provides an output which energizes read source 101 and clock source 108 during the read interval. The BIS signal is likewise connected to the reset terminals of data register 130 to hold it reset at all times except when a badge is being read. When the BIS signal goes to logic 0, the trailing edge triggers badge presence single shot 128, which outputs a pulse indicating that the badge has bottomed in the reader.

In operation, the clock and strobe flip-flops are both placed initially in the reset condition, due to the BIS signal. As the badge is entered, the clock hole corresponding to column 1 allows light to strike clock sensor 109, thereby setting clock flip-flop 120, the output of which fires the clock single shot 121. The output of clock single shot 121 is connected so as to keep strobe flip-flop 122 in the reset condition during the single shot timeout, which is approximately 115 $\mu$sec. By this technique, any ringing effects at the clock sensor die out before the strobe flip-flop is enabled. At the time of the trailing edge of the first clock hole, clock sensor 109 goes dark, thereby setting the strobe flip-flop 122 (the reset signal from clock single shot 121 has been removed). The output of strobe flip-flop 122 in turn triggers strobe single shot 123, the output of which resets the clock flip-flop 120 so as to ready it for the sensing of the clock hole corresponding to column 2. The width of the strobe single shot pulse is designed to be sufficient to blank any ringing effects of the clock sensor caused by the trailing edge of the clock hole, which ringing could otherwise erroneously reset the clock flip-flop. It is thus seen that the clock and strobe flip-flops as arranged, with accompanying single shots buffer out any ringing effects developed by the clock sensor, and allow only one sharply defined clock and strobe pulse to be generated for each of the clock holes in the slide. The clock pulse from single shot 121 is connected to the clock input of data register 130, where the trailing edge clocks the register to enter the data sensed by the read sensors. Data register 130 is a conventional register, suitably comprised of 12 type D flip-flops. The output of strobe single shot 123, labeled $\overline{DA}$, is used by the control logic block 135 for coupling data from register 130 to data conversion block 138, and hence to the transmit circuit 140. Data conversion block 138 suitably contains Holerith to ASCII conversion circuitry, as well as RAM memory, and is controlled by suitable control logic 135. For an example of control of such a data conversion path, see U.S. Pat. No. 4,065,662, assigned to the same assignee. Control logic block 135 also controls receive circuit 141 which receives data from an external source, such as a computer. A display 142 is shown energized by the receive circuit 141, to indicate the state of communication with the external computer.

Referring now to FIGS. 2a, 2b and 2c, there are shown three sequences of a first mechanical arrangement. As shown diagrammatically, elements 36 and 37 are left and right vertical rails respectively, within which a slide element 50 travels. Rails 36 and 37 define a vertical plane, and slide element 50 is normally at the position shown in FIG. 2a, due to the force of gravity. Additional spring force is suitably used in a conventional manner to normally hold the slide 50 in the lower position, and to hold the slide in abutting relation to the badge 42. Slide 50 contains 15 clock holes, as illustrated. Sensors are located at the positons marked A+ (rear sensor), B+ (clock sensor) and C+ (front sensor). The operator enters the badge 42 from the bottom of the unit, positioning it so that the upper right hand corner as seen in FIG. 2a contains the clipped corner. The upper edge of the card is caused to abut slide 50, and the operator pushes the badge upward, thereby raising the slide with it. As seen in FIG. 2b, the badge and the slide have been moved to an intermediate position such that rear sensor 113 (A+) has been covered, and clock sensor 109 (B+) is in registration with the seventh clock hole, such that the seventh column of the badge 42 is being read. When the badge has been pushed all the way in, or bottomed, front sensor 105 (C+) is uncovered, signalling the end of the BIS signal. It is to be understood that in a like manner the badge may be inserted from the top or side of the badge reader, such that slide 50 is pushed down or horizontally against a spring force, as opposed to being pushed up as shown in the sequence of FIGS. 2a-2c. It is also to be recognized that the circuitry can be arranged so that the card is read either as it goes in or as it comes out of the reader.

Referring now to FIG. 3, there is shown another mechanical embodiment of the reader of this invention. In this embodiment, the badge 42 is inserted along a horizontal path into the reader shown generally at 40. Badge 42 has data holes 48 shown diagrammatically, and a latch receiving hole 45 which is an integral part of the method of moving the slide 50, as will be seen. Support assembly 41 supports left rail member 46 and right rail member 47, which members combine with slide support surface 44 to define a generally horizontal slide channel within which slide 50 moves. A slide post 66, seen in greater detail in FIG. 4, extends below the bottom surface of slide 50 and has a constant force spring 67 attached thereto, which holds slide 50 in a normally rearward position. As slide 50 is drawn toward the front of the assembly by the operator, spring 67 exerts a constant restraining force. As also seen in FIG. 3 and FIG. 4, slide 50 contains clock holes 51, which serve the same function as described heretofore.

Mounted toward the front of slide support surface 44 there is illustrated the array of read sensors 102 (the read source array 101 is not shown). Mounted somewhat centrally on left rail member 46 is clock source assembly 52, which houses the clock source 108 at a point such that the light therefrom passes through clock holes 51 as they are drawn past assembly 52. In practice, when the operator inserts badge 42 in the direction of the arrow, at the time that the badge is fully inserted it latches through latch receiving hole 45 to a latch 60 connected to the underside of slide 50; when the badge is withdrawn out of the unit it pulls slide 50 along with it, at which time the data in the card is clocked out by the generation of the clock pulses, in the manner heretofore described. Note, however, that hole 45 in the badge is slightly offset from center, so the reader will latch the badge only when the right kind of badge has been inserted in the proper manner. When the badge is then drawn back out of the unit, it is released from the latch and the spring loaded slide 50 is drawn back to the normal resting position as illustrated in FIG. 3. The badge reader assembly may be constructed so that slide support surface 44 tilts slightly downward to the back, as illustrated, to aid in the return of slide 50 to the rearward position when no badge is inserted into the unit.

Figure 4:
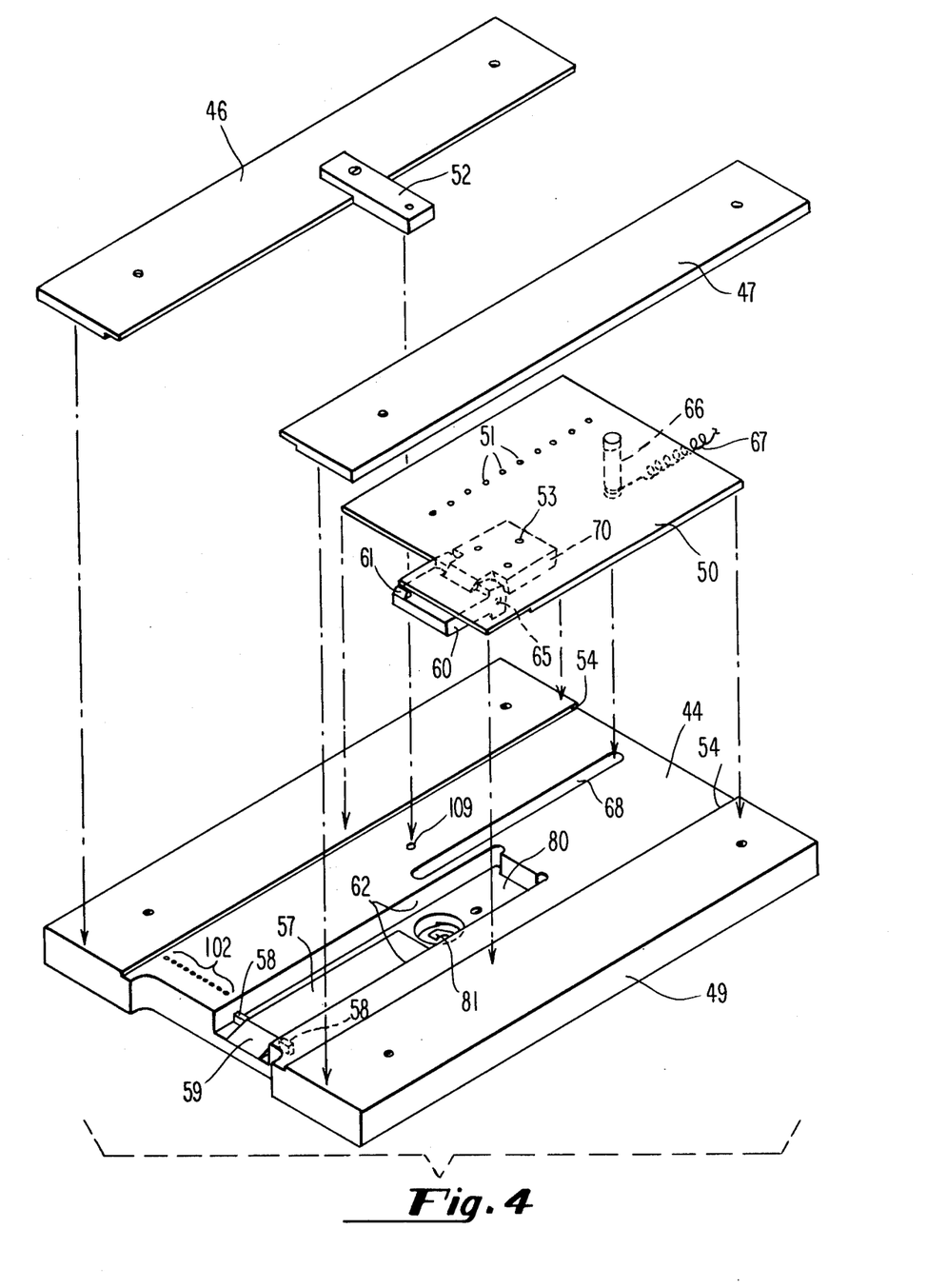
FIG. 4 is an exploded perspective view of the mechanical apparatus of FIG. 3.
Figure 5:
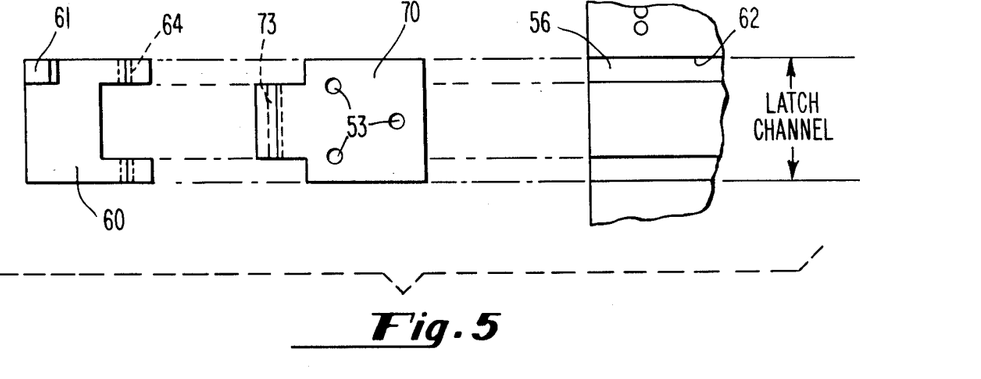
FIG. 5 is an exploded plan detail of the latch and latch support combination used in the mechanical apparatus of FIG. 3.
Figure 5A:
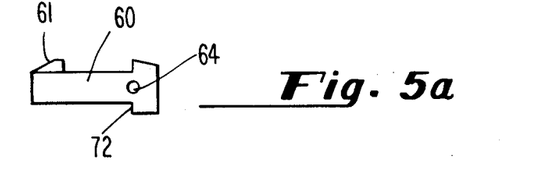
FIG. 5a is a side view of the latch element of FIG. 5.

Referring now to FIGS. 3 and 4 together, the mechanical assembly can be seen in greater detail so as to permit an understanding of the mechanism whereby the slide is latched to the badge, and unlatched when the badge is drawn back out of the slide channel. FIG. 4 shows the interrelationship of slide 50, base plate 49, and rails 46, 47. There is attached to the bottom side of slide 50 a latch support 70, which is attached to slide 50 by latch support screws 53. A latch 60, having an upwardly extending latch element 61 is connected in a pivoting arrangement by latch connecting rod 65 to the forward end of latch support 70. Latch 60, if not otherwise constrained, is free to pivot around connecting rod 65. As shown in greater detail in FIG. 5, the rearward portion of latch 60 has a C configuration which mates with latch support 70, and when support 70 and latch 60 are joined by the pin through latch opening 64 and latch support opening 73, the two units together move through the latch channel 62 which is recessed below slide support surface 44. The latch 60 and latch support 70 ride in latch channel 62 and move along the top of latch support surface 57. To the sides of latch channel 62 are recessed latch tracks 56, within which the lower portions of the hinged sections of the latch ride. Latch 60 is prevented from coming out of the reader due to the fact that latch edge 72, as shown in FIG. 5a, is blocked by latch steps 58. Thus, when assembled, slide 50 slides back and forth on slide surface 44, constrained laterally by slide channel edges 54. Slide post 66 extends downwardly through slide post opening 68 in base plate 49, carrying constant force spring 67 which tends to pull the slider at all times in the backward direction with a constant force. Slide support 70 and latch 60 move together within latch channel 62, in response to a badge being coupled to the latch.

Figure 6A:
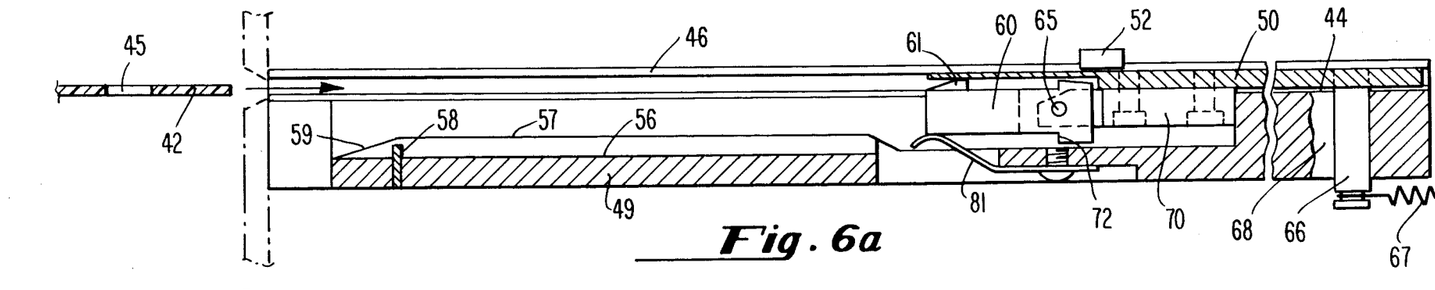
FIGS. 6a, 6b and 6c are diagrams illustrating the relationship of the badge, the slide and the latch within the latch channel of the apparatus of FIGS. 3 and 4, for different positions of the badge within the card reader.
Figure 6B:
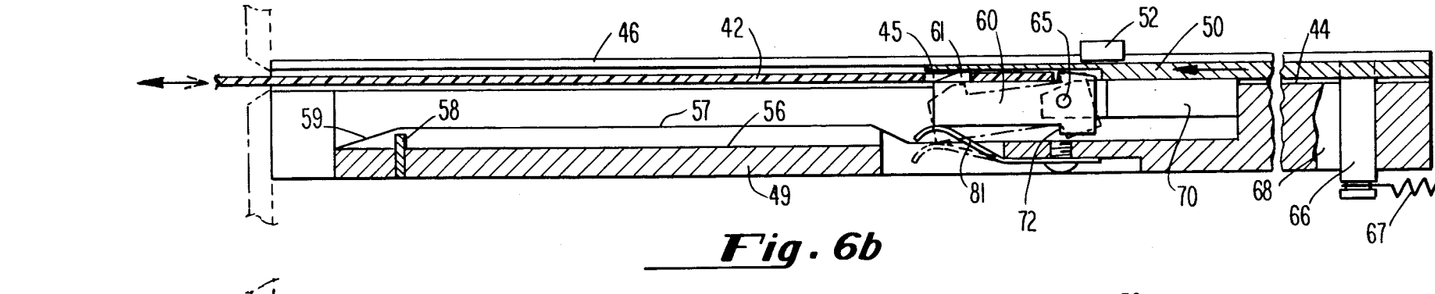
Figure 6C:
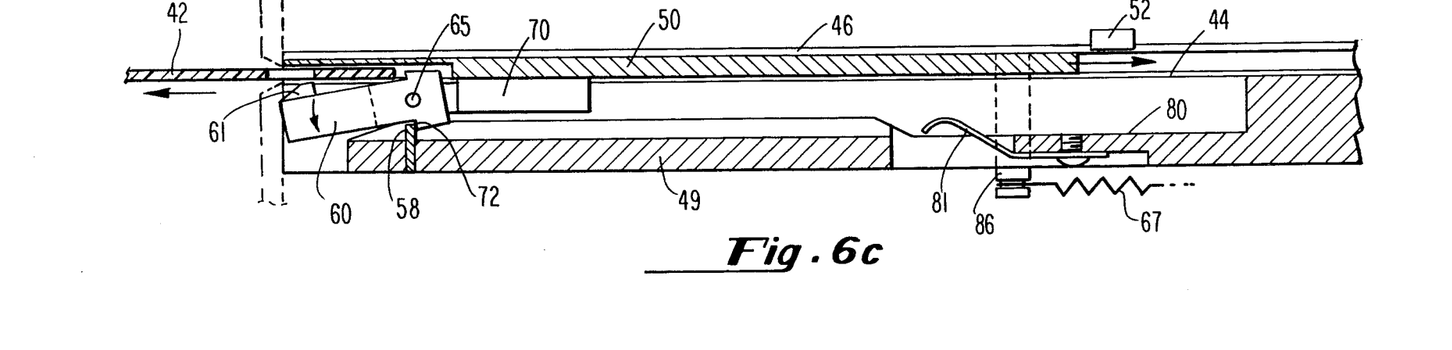

FIGS. 6a, 6b and 6c illustrate the manner of coupling the badge to the latch, and drawing the badge and slide forward for the badge reading operation. As seen in FIG. 6a, the slide 50 is supported on surface 44 and is in its normal rearward position, being held in this position by constant force spring 67 which is attached to the back of the assembly structure. Latch support 70 and latch 60, connected below slide 50, are positioned above a well 80 formed within base plate 49 (as seen in FIGS. 4 and 6c). Latch 60, which is pivotably connected to latch support 70, is held in a substantially horizontal position by a well spring 81. When badge 42 is advanced along slide support surface 44, as indicated by the arrow in FIG. 6A, the leading edge of the badge strikes latch element 61, deflecting it downward as illustrated in FIG. 6b. As the badge is pressed toward the rear of the device, it strikes the upper edge of latch 60. At this point latch element 61 is positioned just below latch receiving hole 45, and is forced up thereinto by the action of spring 81. The badge thus is hooked to the latch, and may be drawn out of the card reader, which is in the left direction as seen in FIG. 6b. As the badge is advanced out, the bottom surface of latch support 70 and the middle section of the bottom surface of latch 60 ride along latch support surface 57, while the bottom of slide 50 rides along slide support surface 44. The rear side extensions of latch 60 move within latch tracks 56. As seen in FIG. 6c, when the badge is pulled all the way to the left, lower back latch edges 72 come into contact with latch steps 58, whereupon the latch 60 automatically pivots in the downward, or counterclockwise direction, as shown in FIG. 6c. Note that latch support surface 57 has a forward support slope 59, which permits latch 60 to pivot downward, at which point latch element 61 is freed from latch receiving hole 45, such that the badge is released. Upon release of the badge, the force of spring 67 withdraws slide 50, and with it latch support 70 and latch 60, back to the normal rearward position as shown in FIG. 6a. By this means, a precise coupling relationship between badge 42 and slide 50 is maintained during the time that the badge is being read, such that the clock holes 51 in slide 50 correspond spatially exactly with the position of the columns of data in badge 42.

In summary, there are disclosed a badge reader with several embodiments of means whereby a slide containing clock holes is caused to move in a predetermined relationship with the badge to be read, permitting the synchronized reading of data contained in the badge. The badge-slide combination, along with the reader circuitry as disclosed in FIG. 1, provides for very accurate and reliable badge reading which is not subject to variations caused by the user. In any of the embodiments, e.g., where the badge is inserted in a horizontal plane or a vertical plane, a tight abutment between badge and slide is achieved, providing the necessary synchronization of clock pulses and data signals. Unique reader circuitry is provided to ensure against false clocking of data.

Although the preferred embodiment has been disclosed with the illustration of a badge reader utilizing a slide, it is to be understood, as set forth in the Background section of this specification, that the clock circuitry for ensuring reliable generation of clock signals can be utilized without the utilization of a slide in the reader. In other words, the clock circuitry is adaptable for utilization in readers where the clock signals are derived from holes or marks on the badge itself, or from other sensors positioned to detect incremental badge movement. As claimed hereafter, the phrase "clock indicia" refers to either holes or marks on a badge, document or slide, for the purpose of generating clock signals; where the term "clock holes" is used, it is meant to indicate either holes or marks.

We claim:
1. Apparatus for reading a data encoded badge, comprising:
    a channel for receiving said badge within said apparatus, said channel permitting said badge to move within it;
    a slide having clock holes, adapted to move within said channel and normally located in a normal position and moveable;
    means for maintaining said badge and said slide in abutting relation while said badge is being moved in a given direction within said apparatus;
    means for reading data from said badge while said badge is moved in said given direction, said reading means incorporating means for synchronizing said data reading with the movement of said clock holes.

2. The apparatus as described in claim 1, wherein said maintaining means comprises spring means which exerts a force against said slide in said given direction when it is displaced from its normal position.

3. The apparatus as described in claim 1, wherein said channel is vertical.

4. The apparatus as described in claim 1, wherein said channel is horizontal.

5. The apparatus as described in claim 1, wherein said slide has a removable element attached thereto, said element carrying imprinted clock indicia thereon.

6. Apparatus for reading a data encoded badge, comprising:
    channel means for receiving said badge within said apparatus;
    a slide having clock holes, adapted to move within said channel;
    means for maintaining said badge and said slide in fixed spatial relation while said badge is being moved in a given direction within said apparatus;
    means for reading data from said badge while said badge is moved in said given direction, said reading means incorporating means for synchronizing said data reading with the movement of said clock holes; and
    wherein said reading means comprises reader circuit means for generating clock signals derived from the clock holes in said slide, means for sensing data upon the occurrence of said clock signals, said reader circuit means comprising a circuit for blocking out ringing signals generated during the generation of said clock signals.

7. The apparatus as described in claim 6, wherein said blocking circuit comprises a first flip-flop - single shot pair of circuits and a second flip-flop - single shot pair of circuits, said circuit pairs being in a cross-coupled configuration.

8. A badge reader adapted to receive a data encoded badge, and having a slide with clock indicia at predetermined positions therein, and having means for maintaining such slide in fixed relationship with the badge as the badge is moved in a given direction within the reader, said reader being characterized by comprising:

read means comprising a read head for generating data signals representative of the data encoded on said badge;

clock sensor means for generating clock signals corresponding to the passage of said clock indicia past a predetermined position within said reader; and     said clock sensor means comprising means for inhibiting generation of clock signals in response to sensor ringing.

9. The badge reader as described in claim 8, wherein said means for inhibiting comprises a clock sensor for developing a two-level signal corresponding to said passage, a first circuit generator responsive to a transition of said two-level signal in a first direction and a second circuit generator responsive to said transition in a second direction.

10. The badge reader as described in claim 9, wherein said first and second circuit generators are in a cross-coupled arrangement.

11. A document reader adapted to receive and read a data encoded document, said document containing clock indicia at predetermined positions in fixed relation to groups of data, said reader comprising means for reading groups of said data in time coincidence with passage of said clock indicia past a predetermined position, characterized in that said reading means comprises sensor means for generating a two-level clock signal corresponding to each passage of a clock indicia and circuit means for generating only a single enabling clock signal derived from said two-level signal and independent of any ringing in said two-level signal.

* * * * *